US012772034B2

(12) United States Patent
An et al.

(10) Patent No.: US 12,772,034 B2
(45) Date of Patent: Oct. 20, 2026

(54) ROAMING DATA CAPTURING VIA SUBSCRIBER IDENTITY MODULE (SIM) APPLET

(71) Applicant: T-Mobile Innovations LLC, Overland Park, KS (US)

(72) Inventors: Kyeong Hun An, Sammamish, WA (US); Ran Chen, Overland Park, KS (US); Mathew George, Kirkland, WA (US); Kulandaivel Marappa Gounder, Bothell, WA (US); Nilesh Ranjan, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 403 days.

(21) Appl. No.: 18/500,557

(22) Filed: Nov. 2, 2023

(65) Prior Publication Data

US 2025/0150803 A1 May 8, 2025

(51) Int. Cl.
*H04W 8/04* (2009.01)
*H04W 8/06* (2009.01)
*H04W 24/08* (2009.01)

(52) U.S. Cl.
CPC ............... *H04W 8/04* (2013.01); *H04W 8/06* (2013.01); *H04W 24/08* (2013.01)

(58) Field of Classification Search
CPC ........................................................ H04W 8/04
USPC ........................................................... 455/433
See application file for complete search history.

(56) References Cited

U.S. PATENT DOCUMENTS 8,131,283 B1 * 3/2012 Vargantwar ........... H04W 36/14 455/433
8,270,966 B1 * 9/2012 Vargantwar ........... H04W 48/18 455/423
2005/0037755 A1 2/2005 Hind et al.
2006/0052113 A1 3/2006 Ophir et al.
2010/0248640 A1 9/2010 MacNaughtan et al.
2012/0077488 A1 3/2012 Unger et al.
(Continued)

FOREIGN PATENT DOCUMENTS

CN 113052308 A 6/2021

OTHER PUBLICATIONS

An, Kyeong Hun et al., "Roaming Management by SIM Applet," filed Jan. 30, 2024, U.S. Appl. No. 18/427,705.
(Continued)

*Primary Examiner* — Qutbuddin Ghulamali

(57) ABSTRACT

A system and method for monitoring and collecting network data in different roaming environments. The method includes searching, by a mobile device, for one or more home networks in a list of available networks; attaching, by the mobile device, to a home network selected from the list of available networks; monitoring, by the mobile device, location of the mobile device after attaching to the home network; detecting, by the mobile device based on the location of the mobile device, a roaming scenario when the mobile device moves outside the home network and attaches to a visited network not on the list of available networks; and collecting, by a subscriber identification module (SIM) applet on the mobile device, performance data associated with the visited network upon detecting that the mobile device is roaming in the visited network.

20 Claims, 7 Drawing Sheets

(56) References Cited

U.S. PATENT DOCUMENTS

| | | | | |
|---|---|---|---|---|
| 2012/0258709 | A1* | 10/2012 | Swaminathan | H04W 48/18 455/433 |
| 2014/0031035 | A1* | 1/2014 | Tagg | H04W 4/02 455/433 |
| 2018/0213078 | A1 | 7/2018 | Visuri et al. | |
| 2019/0037484 | A1* | 1/2019 | Davies | H04W 8/04 |
| 2019/0182655 | A1* | 6/2019 | Gupta | H04W 12/06 |
| 2019/0215250 | A1* | 7/2019 | Báder | H04L 41/5019 |
| 2020/0084829 | A1* | 3/2020 | Tang | H04L 67/143 |
| 2020/0236527 | A1* | 7/2020 | Sood | H04W 8/04 |
| 2021/0092791 | A1* | 3/2021 | Jeong | H04W 76/22 |
| 2021/0297940 | A1* | 9/2021 | Prakasam | H04W 48/18 |
| 2022/0225075 | A1* | 7/2022 | Shao | H04W 8/08 |
| 2023/0300595 | A1* | 9/2023 | Dudar | H04W 8/02 455/433 |
| 2023/0396980 | A1 | 12/2023 | Kanchiraju et al. | |
| 2024/0340633 | A1 | 10/2024 | Ahluwalia et al. | |
| 2025/0024244 | A1 | 1/2025 | Chong et al. | |
| 2025/0063452 | A1 | 2/2025 | O'Hurley et al. | |
| 2025/0071538 | A1* | 2/2025 | Jensen | H04W 8/12 |
| 2025/0247685 | A1 | 7/2025 | An et al. | |
| 2025/0247686 | A1 | 7/2025 | An et al. | |

OTHER PUBLICATIONS

An, Kyeong Hun et al., "Returning Attachment of a Communication Device to a Home Wireless Communication Network Based on Geo-location," filed Jan. 30, 2024, U.S. Appl. No. 18/427,710.

First Office Action dated Dec. 8, 2025, U.S. Appl. No. 18/454,600, filed Aug. 23, 2023.

Jensen, Daniel C., "Systems and Methods for Proactively Transitioning Roaming User Equipment to its Home Network," filed Aug. 23, 2023, U.S. Appl. No. 18/454,660.

First Office Action dated Mar. 12, 2026, U.S. Appl. No. 18/427,710, filed Jan. 30, 2024.

Notice of Allowance dated Apr. 21, 2026, U.S. Appl. No. 18/454,600, filed Aug. 23, 2023.

Office Action dated Jun. 5, 2026, U.S. Appl. No. 18/427,705, filed Jan. 30, 2024.

* cited by examiner

ROAMING DATA CAPTURING VIA SUBSCRIBER IDENTITY MODULE (SIM) APPLET

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication devices may complete an authentication process with a cell site to obtain a wireless communication link from the cell site and access to the radio access network that the cell site is a part of. This may involve the wireless communication device radio transceiver obtaining network access keys or network access credentials from a subscriber identity module (SIM) and providing those network access keys or network access credentials to the cell site. The SIM may be a smart card that comprises memory and a processor.

SIM cards may be removable in some circumstances, for example in traditional mobile phones. By removing a first SIM card and installing a second SIM card in a mobile device, a user may change his or her service provider network, such as a home network to which the mobile device normally connects. Within a home network, the mobile device may obtain services based upon a monthly fee structure or without a use-based fee structure. When leaving a home network, the user usually loses the ability to make calls using their mobile device. As such, network providers may enter into various roaming agreements to enable a user from one network to visit other networks and still obtain connectivity for their mobile device even when they are located outside of their home network (i.e., roaming). In order to provide connectivity over large areas of the country (e.g., outside of a user's home network), home network providers often have a number of roaming agreements with a variety of different networks over the entire country and possibly other countries.

Removable SIM cards may not be provided in some wireless communication devices, such as a SIM-less mobile phone. In some cases, the role of the SIM card may be performed via other means such as an embedded universal integrated circuit card (eUICC), which may include a virtual (e.g., software-based) SIM. Smart cards such as eUICCs and SIM cards may be provisioned with network access keys and/or network access credentials, one or more access point names (APNs), a preferred roaming list (PRL), branding information, applications, and other data artifacts. The radio transceiver may then obtain the network access keys or network access credentials from the eUICC (or SIM card) and provide those network access keys or network access credentials to the cell site to obtain a wireless communication link.

SUMMARY

In an embodiment, a method is provided. The method includes searching, by a mobile device, for one or more home networks in a list of available networks; attaching, by the mobile device, to a home network selected from the list of available networks; and monitoring, by the mobile device, location of the mobile device after attaching to the home network. The method further includes detecting, by the mobile device based on the location of the mobile device, a roaming scenario when the mobile device moves outside the home network and attaches to a visited network not on the list of available networks; and collecting, by a subscriber identification module (SIM) applet on the mobile device, performance data associated with the visited network upon detecting that the mobile device is roaming in the visited network. The method further includes transmitting the performance data from the mobile device to a server associated with a service provider of the mobile device; and detaching by the mobile device, based on the performance data, from the visited network and attaching to a second visited network.

In another embodiment, a communications system is provided. The communications system comprises a home network, a network server in the home network, and a wireless communication device configured to communicate with the network server. The wireless communication device is further configured to monitor location of the wireless communication device after attaching to the home network; detect, based on the location of the wireless communication device, a roaming scenario when the wireless communication device moves outside the home network and attaches to a visited network not on the list of available networks; collect, by a subscriber identification module (SIM) applet on the wireless communication device, performance data associated with the visited network upon detecting that the wireless communication device is roaming in the visited network; and send the performance data to the network server in the home network. Furthermore, the network server is configured to derive one or more key performance indicators (KPIs) based on the performance data from the wireless communication device.

In yet another embodiment, a method is provided. The method includes searching, by a mobile device, for one or more home networks in a list of available networks; attaching, by the mobile device, to a home network selected from the list of available networks; monitoring, by the mobile device, location of the mobile device after attaching to the home network; detecting, based on the location of the mobile device, a roaming scenario when the mobile device moves outside the home network and attaches to a visited network not on the list of available networks; collecting, by a subscriber identification module (SIM) applet on the mobile device, performance data associated with the visited network upon detecting that the mobile device is roaming in the visited network; and discontinuing, by the SIM applet, collection of the performance data upon detecting that the mobile device has re-attached to the home network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
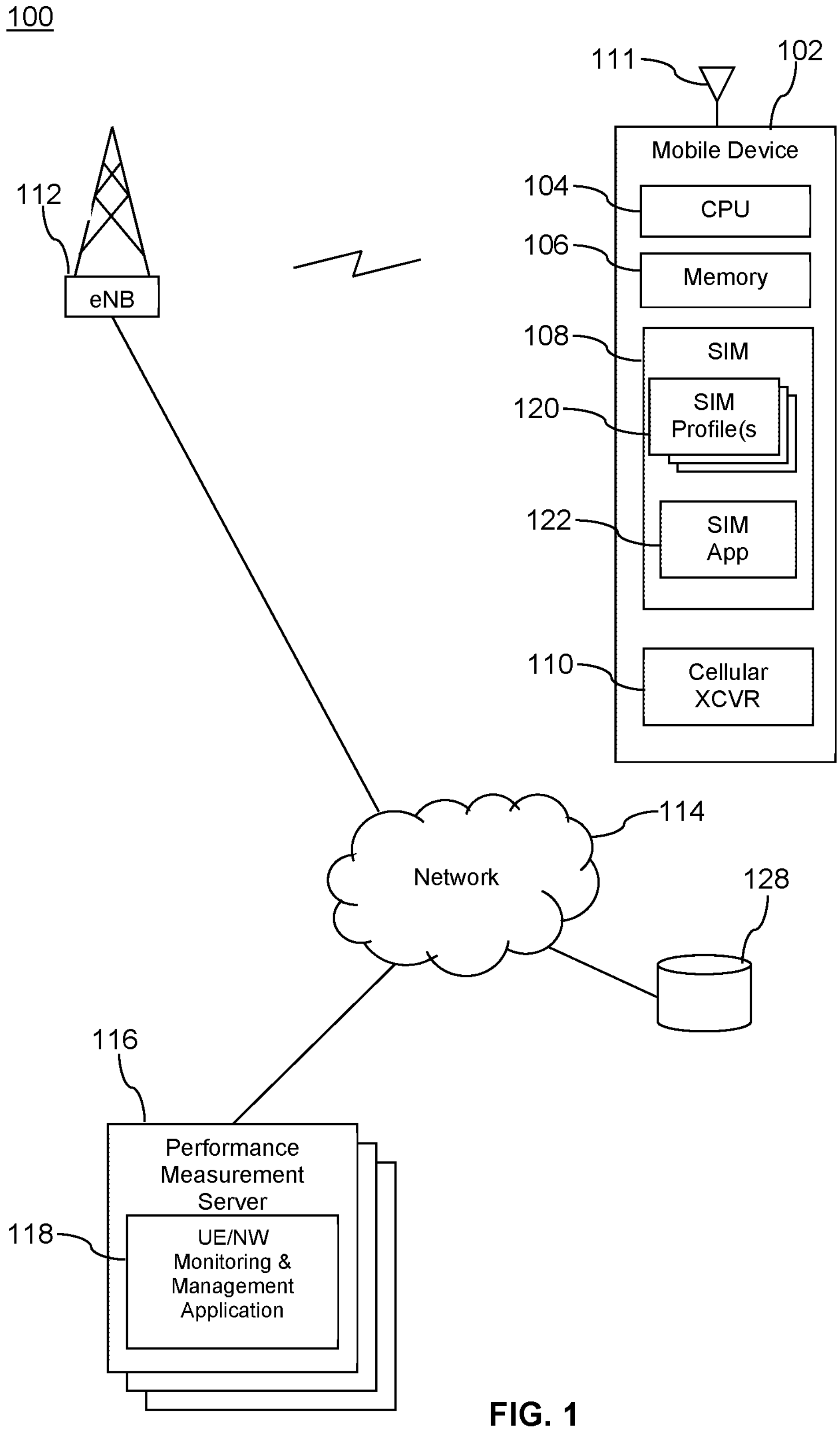
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a SIM applet may be installed in a mobile communications device, and the SIM applet may be configured to selectively monitor and collect data about one or more networks to which the mobile communications device may attach. To this end, the SIM applet may consult one or more network priority lists (e.g., home network list, visited network list, roaming network list, etc.) onboard the mobile communications device to determine whether to enable/disable data collection. For example, the SIM applet may disable data collection when the mobile communications device is connected to a home network. The home network may be able to obtain desired performance data in the home network independently of the SIM applet performing data collection, obviating the rationale for the SIM applet collect data. The SIM applet may then monitor location of the mobile communications device to detect whether the mobile device is within a coverage area of the home network.

In an embodiment, the SIM applet automatically activates and enables data collection upon detecting that the mobile device has exited the home network and is roaming in another network. This other network may have a roaming agreement with a service provider of the mobile device's home network. However, certain details regarding performance/quality of the roaming network may not be shared by a roaming network with the service provider or might not otherwise be known to the service provider. To assess such performance/quality, the SIM applet may collect and transmit various metrics about the roaming network to the service provider so long as the SIM applet detects that the mobile device is roaming in that network. The service provider may then use such metrics to develop one or more key performance indicators (KPIs) about the roaming network, e.g., quality of service (QOS), congestion, traffic load, latency, etc.

In an embodiment, the SIM applet registers to receive events from the main communication application of the mobile communication device. The SIM applet collects and buffers information pertaining to the received events and bundles information about a plurality of events in one or messages. On a periodic interval such as every ten minutes or every hour or some other periodic interval, the SIM applet requests a communication link from the main communication application of the mobile communication device and transmits the bundled information about the plurality of events in one or messages back to the home network or to the home service provider. After transmitting the messages back to the home network, the SIM applet may cause the communication link to the home network to be taken down.

When the SIM applet has already collected and returned information to the home network previously, for example when the mobile device has been attached to the same cell site for a period of time and has already conveyed more than a pre-defined threshold volume of event data while attached to that cell site, the SIM applet can start reducing the information it stores and returns. For example, the SIM applet can store every fifth event of a given event type, every tenth event of a given event type, every fifteenth event of a given event type, or some other number and bundle only these stored events, discarding the intervening events. This can reduce the storage burden on the mobile device and on the communication network sending event information from the SIM applet back to the home network. The SIM applet can indicate in the messages it returns to the home network how many events of each given type it has ignored or discarded when it sends event information back to the home network.

The events registered for by the SIM applet may comprise events about call originations, call drops, network rejections, what the device does upon reboot, and information about cell site signal strengths. In an embodiment, the SIM applet can collect information not just related to cell sites that the mobile communication device attaches to but also information related to other cell sites proximate to the mobile communication device that it is not attached to.

In some aspects, the service provider may collect and combine such metrics from a plurality of mobile devices so as to optimize KPIs and develop a better understanding of user experience in roaming networks visited by such mobile devices. For example, the service provider may determine a KPI for a roaming network as an average of values of the KPI collected from a plurality of mobile devices that have received roaming service in the given roaming network. In an embodiment, the KPI may be determined as a rolling average or a windowed average that is determined based on data collected over a recent period of time, for example collected over the last week, collected over the last month, collected over the last quarter and disregarding data collected prior to the current analysis window.

Moreover, the service provider may be configured to store and evaluate KPIs from roaming networks to identify target roaming networks to which mobile devices in the home network should connect, e.g., in the case of a handover or cell selection/reselection. For example, if a mobile device is located in a home network region with poor/spotty coverage, the home network service provider may inform the mobile device to connect to a different network, e.g., a roaming partner network known/predicted to have improved coverage based on KPIs derived for that roaming partner network. Alternatively, the mobile device may autonomously decide to connect to a different network based on current user experience and a locally stored network priority list. In some aspects, the service provider may instruct a particular mobile device to update its network priority list (e.g., add/remove a roaming network, modify order, etc.) based on KPIs derived from data collected by one or more mobile devices, which may or may not include the particular mobile device. Furthermore, the service provider may share KPI information with one or more roaming/partner networks to jointly identify and troubleshoot network issues, e.g., so as to improve coverage, user experience, etc. These and other aspects are detailed herein below.

Turning now to FIG. 1, a system 100 is described. In an embodiment, the system 100 comprises a wireless communication device 102 such as a mobile device, a mobile phone, a PDA, a laptop computer, a tablet computer, a notebook computer, a smartphone, etc. The wireless communication device 102 comprises a processor 104, a memory 106, a SIM 108, a cellular radio transceiver 110, and an antenna 111. As used herein, the term wireless communication device may be used interchangeably with other terms such as "mobile device," "wireless device," "user equipment (UE)", "mobile station," "handset," "smartphone," "personal digital assistant" (PDA), or the like.

A portion of the memory 106 may be a non-transitory memory and a portion of the memory 106 may be a transitory memory. The SIM 108 may be configured to store one or more of security algorithms for authentication, personal information, network authentication keys, or service level and personal data of a user of the wireless device 102. In some aspects, the SIM 108 may comprise a removable and/or replaceable smartcard, which may be equipped with processing functionality, memory, applications and the like. In some aspects, the SIM 108 may be embedded in the wireless device 102. In some aspects, the SIM 108 may comprise a virtual SIM or the like. Those of ordinary skill in the art will appreciate that the SIM 108 may be implemented in a variety of suitable manners, such as via a smartcard, an embedded SIM (eSIM), a dual-SIM, a universal integrated circuit card (UICC), an embedded UICC (eUICC), etc.

When properly activated and provisioned with a SIM profile 120, the wireless device 102 may be able to establish a wireless communication link to a radio access network (RAN), for example to a cell site 112. The cell site 112 may provide the wireless device 102 a communication link to a network 114. The network 114 may be one or more local area networks (LANs), one or more public networks (e.g., a public land mobile network (PLMN)), one or more private networks, or any combination thereof.

The wireless device 102 may communicate via the cell site 112 and via the network 114 to a performance measurement server 116 communicatively coupled to the network 114 and to a user equipment (UE) and network (UE/NW) monitoring and management application 118 that executes on the performance measurement server 116. The performance measurement server 116 may be implemented as a computer system. Computer systems are described further hereinafter with respect to FIG. 7.

The cellular radio transceiver 110 may be able to establish wireless communication with the cell site 112 via the antenna 111 based on any suitable protocol, such as a 5$^{th}$ Generation (5G), a Long-Term Evolution (LTE), a code division multiple access (CDMA), a global system for mobile communications (GSM) telecommunications protocol, or the like. While a single wireless device 102 is illustrated in FIG. 1, it is understood that the system 100 may comprise any number of devices 102.

The communication service provided to the wireless device 102 by the cell site 112 and/or by the network 114 may in part be determined based on access credentials or access point names (APNs) provided by the wireless device 102 to the cell site 112 when requesting a wireless communication link from the cell site 112. The access credentials and APNs may be read by the cellular radio transceiver 108 from the SIM 108, for example via an active SIM profile 120 stored in the SIM 108. Additionally/alternatively, the access credentials and APNs may stored in and retrieved from another portion of the wireless device 102, e.g., the memory 106.

In some aspects, the SIM profile 120 may include a preferred roaming list (PRL) or a public land mobile network (PLMN) file that provides the wireless communication device 102 with a priority order for connecting to various roaming partners of the home network provider. Additionally, the SIM profile 120 may include subscriber information, network/service provider information, authentication information, subscription policies, identifiers (e.g., an international mobile subscriber identity (IMSI)), security keys, a phone number, a mobile directory number (MDN), or Microsoft Developer Network (MSDN) identity, a carrier identity, a network identity, a model of device 102, a hardware version identity of device 102, and/or a software version identity of device 102.

In an embodiment, the SIM 108 may be pre-loaded with a plurality of SIM profiles 120, where one SIM profile 120 may be active at any one time. In an embodiment, the cellular radio transceiver 110 may receive information such as the SIM profile, access credentials, and APNs via a SIM software application ("applet") 122 installed on the wireless device 102. In some aspects, the SIM applet 122 may reside on the SIM 108. In other aspects, the SIM applet 122 may reside elsewhere on the wireless device 102. For example, the SIM applet 122 may be stored in a non-transitory portion of the memory 106 and configured for execution by the processor 104.

In an embodiment, when the wireless device 102 is first powered on, the SIM applet 122 may determine an identity of the wireless device 102, select a suitable one of the SIM profiles 120 pre-loaded into the SIM card 108, and activate the selected SIM profile 120 for use in cellular radio communications. For example, the SIM applet 122 may use the identity of the wireless device 102 as an index into a data structure stored in the non-transitory portion of the memory 106, for example look-up table (LUT), to look-up a SIM profile 120 that matches the index.

In an embodiment, the SIM applet 122 may send a SIM profile selection request message including the identity of the wireless device 102 to the performance measurement server 116. The UE/NW monitoring and management application 118 may use the identity of the wireless device 102 to look up a suitable SIM profile identity in at least one data store 128 and return this identity to the SIM applet 122. The SIM applet 122 may then activate the SIM profile 120 identified by the UE/NW monitoring and management application 118.

In some aspects, the at least one data store 128 may comprise one or more of a home location register (HLR), a Home Subscriber Server (HSS), an equipment identity register (EIR), an authentication center (AuC) containing information about subscribers, equipment and subscriber authentication, an over-the-air (OTA) activation platform, or the like. While the at least one data store 128 is shown as being separate from the performance measurement server 116, the at least one data store 128 may be integrated with the performance measurement server 116 in other implementations.

In an embodiment, the SIM applet 122 may acquire the SIM profile 120 from the data store 128. Alternatively, the UE/NW monitoring and management application 118 may acquire the SIM profile 120 from the data store 128 and send that SIM profile 120 to the SIM applet 122. The SIM applet 122 may then store the received SIM profile 120 (e.g., in the SIM 108, in a portion of the memory 106, etc.), and then make that stored SIM profile 120 the active SIM profile of the SIM 108.

In an embodiment, the SIM 108 may initially have a bootstrap SIM profile active. The wireless device 102 may obtain a wireless communication link from the cell site 112 based on the bootstrap SIM profile. The SIM applet 122 may then communicate with the performance measurement server 116 to obtain an identity of a pre-loaded SIM profile 120 to activate. Alternatively, the SIM applet 122 may obtain a SIM profile 120 from the UE/NW monitoring and management application 118, store the received SIM profile 120 on the wireless device 102 (e.g., in SIM 108), and make the downloaded SIM profile 120 active on the SIM card 108.

In an embodiment, the SIM card 108 may have a default or generic SIM profile 120 that is initially activated. The SIM applet 122 may collect or otherwise obtain data on the communication activity of the wireless device 102 and send this communication and/or performance data to the performance measurement server 116. This data may be referred to as a communication history of the wireless device 102. The collected communication history data may comprise information about average sent data volumes. The collected communication history data may comprise information about average received data volume. The collected communication history data may comprise information about communication services used by the wireless device 102. The UE/NW monitoring and management application 118 may analyze the communication and performance history of the wireless communication device 102 and identify a suitable SIM profile 120 that it then commands the SIM applet 122 to activate in the SIM 108. In some aspects, the UE/NW monitoring and management application 118 may combine this information with communication/performance information obtained from one or more other wireless communication devices in the network 114 so as to monitor and optimize user experience, network performance, or the like.

As discussed further below, the SIM applet 122 in the wireless device 102 may be configured to collect information about the network 114 and report such data (e.g., based on a triggering event and/or based on a periodic interval) back to the performance measurement server 116 for processing. For example, the SIM applet 122 may be configured to register with a communication application executing on the processor 104 and/or on the cellular transceiver 110 to receive events about communication activities of the wireless device 102. These events may be call origination events, call drop events, network rejection events, events pertaining to communication actions of the wireless device 102 during reboot, and/or other communication related events. In an embodiment, the SIM applet 122 processes the information of the events to produce roaming network performance indications or key performance indicators (KPIs).

The information collected via the SIM applet 122 may comprise one or more network parameters such as quality of service (QOS), congestion, latency, jitter, traffic load, drops, uplink/downlink delays, or the like. Based on the collected information, the UE/NW monitoring and management application 118 (or other entity associated with performance measurement server 116) may develop various performance metrics (e.g., KPIs) to assess and optimize network connectivity, user experience, and the like. Furthermore, the UE/NW monitoring and management application 118 may use such system parameters to generate commands/messages for the wireless device 102, and the performance measurement server 116 may then covey those commands/messages to the wireless device 102.

Figure 2:
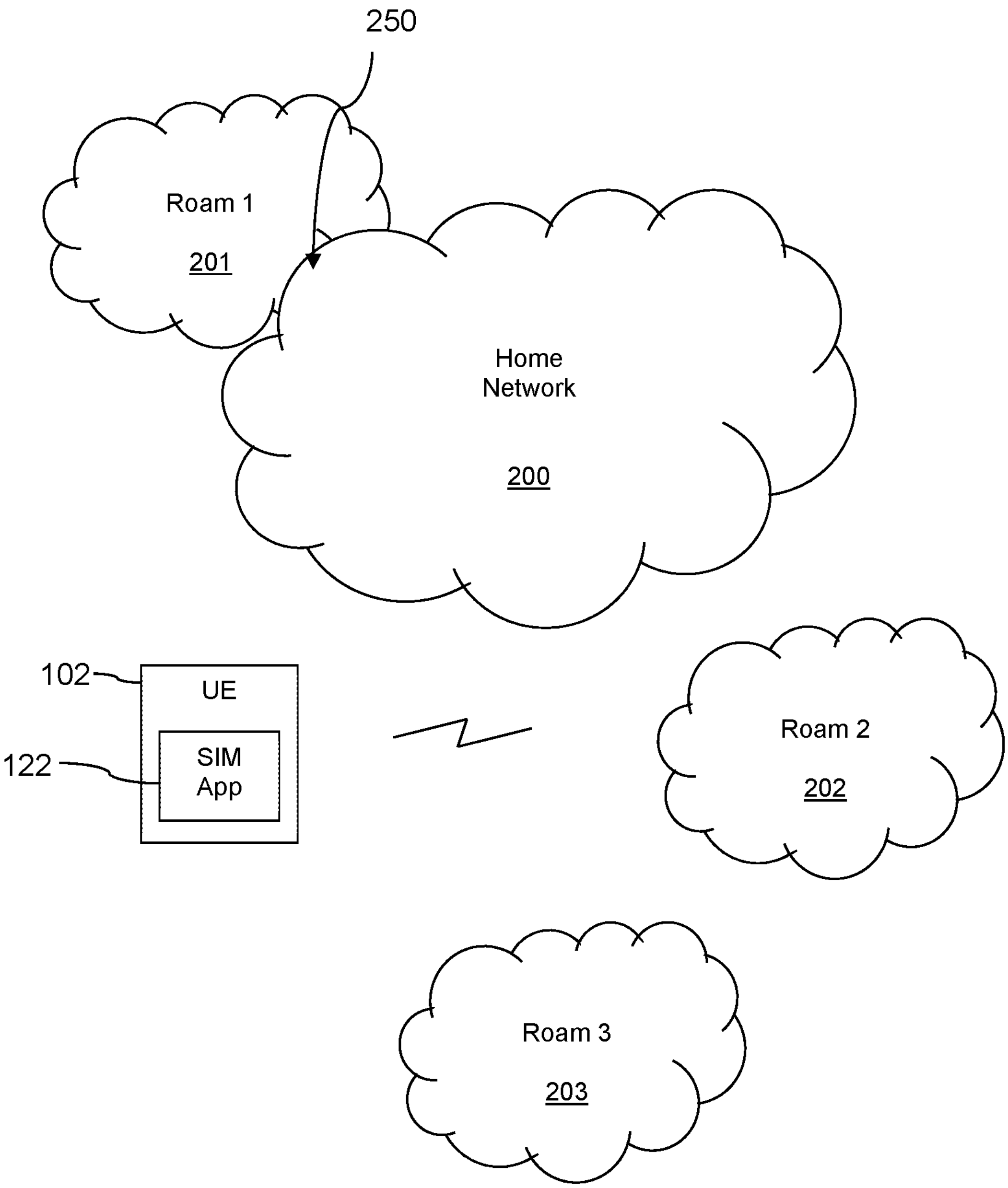
FIG. 2 is a block diagram of a roaming architecture according to an embodiment of the disclosure.

FIG. 2 depicts an example of a roaming architecture to which the system 100 is applicable. The roaming architecture comprises a home network 200 and a plurality of roaming networks 201, 202, and 203. The home network 200 is the home operating area where the wireless communication device 102 may access network services (e.g., according to standard charges, service agreement, etc.). While the wireless communication device 102 is shown as a user equipment (UE) 102 in FIG. 2, the wireless communication device 102 may comprise other types of devices in other implementations.

When attempting to register with a network to provide connectivity to the wireless communication device 102, the wireless communication device 102 may initially determine the signal strength of all of the networks 200-203 within the range of the wireless communication device 102. If the home network 200 is providing sufficient signal strength, the wireless communication device 102 may attach to the home network 200, and thus obtain connectivity and services (e.g., calls) through the home network 200.

However, in some cases, the home network 200 may not be able to provide sufficient signal strength to the wireless communication device 102. For instance, this may occur when received signal strength on the home network 200 falls below a predetermined threshold. In other cases, the wireless communication device 102 may exit the home network 200 and/or be configured to obtain coverage from another network (e.g., even while in the home network 200). In the foregoing cases, the wireless communication device 102 may determine a roaming partner 201, 202, or 203 of the home network 200 to which the wireless communication device 102 may or should connect. The wireless communication device 102 may determine how to interconnect with one of the partner networks 201, 202, or 203 based upon policies and/or priority information, e.g., a priority roaming list in SIM 108.

When in a roaming mode of operation, the wireless communication device 102 may initially scan for each of the available roaming networks 201, 202, and 203 and detect their respective signal strengths. Once the wireless communication device 102 knows each of the available roaming networks 201-203, the wireless communication device 102 may access policy/priority information to determine which of the networks 201-203 the wireless communication device 102 should first attempt to access. The determination as to which roaming network 201, 202, or 203 to access can be based on a priority order of the roaming networks 201-203 (e.g., per a PRL) and those having required signal strength characteristics to provide connectivity with the wireless communication device 102.

In some circumstances, a wireless communication service provider may not have control or access to network information via the mobile communication device 102, for example because the wireless communication device 102 may be roaming in a partner network to which the service provider has little to no visibility. That is, if the wireless communication device 102 exits the home network 200 and connects to roaming network 203, the service provider associated with the home network 200 may not have access to performance/quality data (e.g., download/upload speed, traffic load, delay, latency, jitter, etc.) of the roaming network 203. While there may be instances where the roaming network 203 may share certain details about performance/ quality with the UE's service provider, such details may not be reliable and/or sufficient to assess user experience on the roaming network 203.

In an embodiment, the SIM applet 122 may be configured to collect metrics about each network 200-203 to which the wireless communication device 102 connects. Such metrics may comprise one or more network measurement results (NMRs), for example a current radio signal to noise ratio (SNR) and a radio timing advance. The time advance information may be used to infer a distance of the device 102 from a cell site or from a wireless access point. If the wireless communication device 102 associated with the SIM card 108 has a global positioning system (GPS) receiver (e.g., GPS 538 in FIG. 5), the collected information may comprise a set of current GPS coordinates.

In some aspects, the collected information may comprise one or more of network operator information, network mode, received signal strength indicator (RSSI), reference signal received power (RSRP), reference signal received quality (RSRQ), signal-to-interference-plus-noise ratio (SINR), KPI measurements, and the like. In some aspects, the SIM applet 122 may package the collected information (into a data field or information elements (IEs)) and transmit the packaged information in a message to the performance measurement server 116 e.g., periodically or when triggered by event.

In some aspects, the information collected by the SIM applet 122 may further comprise location data such as an identity of a current serving cell site (e.g., a known location of the identified cell site may be used as a proxy for the location of the wireless device 102). In some aspects, the information collected by the SIM applet 122 may further include timing information. For example, the wireless communication device 102 may record timestamps associated with certain events, e.g., dropped call, service interruption, network failure, etc.

By providing the ability to collect information about each network 200-203 by the SIM applet 122, the service provider may be able to obtain information that otherwise would be unavailable to the service provider (such as performance/quality metrics about roaming networks 201-203). Thus, when the wireless communication device 102 connects to roaming network 202, for example, the SIM applet 122 may collect and report network data to the performance measurement server 116 such that the service provider may derive various metrics and KPIs associated with that network 202. Such metrics and KPIs may include statistics such as delay, jitter, frame loss ratio, connection failure, congestion, quality of service (QOS) (e.g., voice, data, etc.), availability, faults, bit error rate (BER), call drops, etc.

As discussed above, the SIM applet 122 may be configured to monitor and collect various types of data associated with each network 200-203 to which the wireless communication device 102 connects. However, continuously monitoring and collecting such data can lead to excessive consumption of resources (e.g., bandwidth, memory, power). Further, the SIM applet 122 may wind up collecting more data than necessary and/or too much data to efficiently process. In such cases, potentially valuable pieces of collected data may be discarded and/or overlooked.

In an embodiment, such data-collection concerns may be alleviated by selectively activating the SIM applet 122. For example, when the wireless communication device 102 connects to the home network 200, the wireless communication device 102 may generally remain connected to the home network 200 for the majority of the duration in which the wireless communication device 102 is in need of service. However, unlike the case with roaming networks 201-203, the service provider of the wireless communication device 102 may utilize various measurements (e.g., via core network nodes, UEs, access devices, etc.) and techniques to assess connectivity and performance of the home network 200, i.e., independent from data collected via the wireless communication device 102. As such, the service provider may decide it is not necessary for the SIM applet 122 to collect and provide information about the home network 200 so long as the wireless communication device 102 is within its coverage.

In an embodiment, the SIM applet 122 in the wireless communication device 102 is configured to remain off when the wireless communication device 102 is connected to the home network 200, and to automatically turn on when the wireless communication device 102 is roaming in a partner network (e.g., network 201, 202, or 203). As such, the SIM applet 122 will not monitor or collect data/metrics when the wireless communication device 102 is on the home network 200. However, when the wireless communication device 102 leaves the home network 200 and enters a partner network such as network 202, the SIM applet 122 may immediately activate and begin collecting data/metrics when detecting the wireless communication device 102 is roaming on the partner network 202.

In some aspects, the SIM applet 122 may be configured to report collected data/metrics to the performance measurement server 116 on demand, periodically, and/or when a quantity of collected data/metrics exceeds a threshold. In one example, the SIM applet 122 may be configured to collect data/metrics in a buffer of the wireless device 102, and the SIM applet 122 may report collected data/metrics when the buffer is at or near capacity or a threshold. Additionally/alternatively, the SIM applet 122 may be configured to report collected data/metrics when triggered by certain events. In some aspects, the SIM applet 122 may be configured to collect different types of data/metrics depending on which network the wireless device 102 connects to. For instance, the SIM applet 122 may be configured to collect one or more specific quality/performance metrics when the wireless device 102 is connected to a roaming network (e.g., network 201, 202, or 203), but the SIM applet 122 may disregard some or all of these specific quality/performance metrics when the wireless device 102 is connected to the home network 200, thereby conserving power/resources on the wireless device 102.

Further still, the SIM applet 122 may be configured to perform more or less intensive data collection under certain circumstances. For example, based on roaming statistics obtained via devices such as collected by the SIM applet 122 of the wireless communication device 102, the service provider of the wireless communication device 102 may have a sufficient understanding/confidence regarding quality/performance of a particular network such as roaming network 202. Hence, the service provider may configure the SIM applet 122 to monitor/collect less data when the wireless communication device 102 is connected to that roaming network 202. For instance, the SIM applet 122 may monitor/collect only a subset of the data (e.g., certain type) it would otherwise monitor/collect when the wireless communication device 102 is connected to other roaming networks (e.g., network 201 or 203).

In some aspects, the SIM applet 122 may perform less intensive data collection by reducing the rate at which the SIM applet 122 is to collect and/or report data/metrics. For instance, the SIM applet 122 may be configured such that when a certain event occurs multiple times at a same location (e.g., cell cite) and/or within a certain duration, the SIM applet 122 reports event information at a certain rate, e.g., a certain probability factor or percentage of time at which the event occurs (e.g., 1 report per X events, where X is a positive integer greater than or equal to 1).

As previously mentioned, the performance measurement server 116 is configured to accumulate a pool of data about each roaming network 201-203 from the wireless communication device 102 and/or other wireless devices. In an embodiment, when the data accumulated for a particular roaming network (e.g., network 203) reaches or exceeds a threshold, the performance measurement server 116 may command such wireless devices (e.g., via system information block (SIB), master information block (MIB), broadcast information, radio resource control (RRC) signaling, etc.) to throttle back data-collection while connected to that particular roaming network (e.g., network 203).

In such cases, for example, wireless communication devices connected to that roaming network may collect and/or report a fraction of data (e.g., 1% or 20% as much data) that would otherwise be collected and/or reported to the performance measurement server 116. In some cases, the performance measurement server 116 may opt to throttle back data-collection for a given roaming network by reducing the quantity of devices configured to collect/report network metrics to the performance measurement server 116. For example, assume (1) multiple wireless communication devices associated with the home network 200 are connected to roaming network 202 and configured to collect/report metrics thereof, and (2) the performance measurement server 116 has accumulated sufficient data for roaming network 202. As such, the performance measurement server 116 may determine to limit data-collection by reducing the quantity of wireless communication devices that collect/report data while connected to the roaming network 202, e.g., the performance measurement server 116 may configure/command only a subset of the connected devices to collect/report data about roaming network 202.

In some embodiments, the roaming architecture in FIG. 2 may comprise one or more networks that the wireless communication device 102 may treat as home (or preferred) networks in addition to home network 200. In such embodiments, the wireless communication device 102 may maintain a list of home networks such as a home PLMN (HPLMN) list, which may be arranged in prioritized order. Thus, if the wireless communication device 102 is capable of attaching to multiple different home networks, the wireless communication device 102 may consult the HPLMN list and select the home network having the highest priority and/or signal strength. The wireless communication device 102 may separately maintain and consult a similar list, but of roaming networks such as a visited PLMN (VPLMN) list. For example, any network not listed in the HPLMN list may be considered a roaming network, and thus be added to the VPLMN list. In some aspects, the HPLMN and VPLMN lists may be updateable to add, remove, modify networks. Additionally, the HPLMN and VPLMN lists may be combined together. Further, the wireless communication device 102 may comprise a master list including all networks to which the wireless communication device 102 may connect.

In some embodiments, the SIM applet 122 may request certain location information and network identifiers from the wireless communication device 102, e.g., to determine whether one or more home/roaming networks are within range of the wireless communication device 102. Network identifiers may include a system identifier (SID), a network ID (NID), a mobile country code (MCC), a mobile network code (MNC), a cell ID, and the like. In some aspects, the wireless communication device 102 may share such identifying information with the performance measurement server 116. Furthermore, the wireless communication device 102 may be configured to store such identifying information, e.g., as part of a SIM profile 120, in memory 106, etc.

In an embodiment, the HPLMN list and/or VPLMN list may be updated to include or remove networks. For example, if the service provider of the wireless communication device 102 determines that roaming network 202 cannot provide adequate user experience (e.g., based on data collected and provided by one or more mobile devices connected to the roaming network 202), the service provider may instruct (e.g., via performance measurement server 116) the wireless communication device 102 to remove roaming network 202 from the VPLMN list or to lower its priority order/ranking on the VPLMN list.

In some embodiments, the performance measurement server 116 may be connected to one or more mobile devices having SIM applets or other mechanisms similarly configured to collect and convey network metrics from roaming networks (e.g., such as those having a roaming agreement/partnership with the service provider of the home network of such mobile devices). As such, the performance measurement server 116 may aggregate and analyze such data to derive various KPIs so as to develop a better understanding of the underlying conditions in those roaming networks. In some aspects, the performance measurement server 116 may use such KPIs to identify and/or prioritize roaming networks to which wireless communication device 102 may/should connect, e.g., during a handover, cell selection/reselection, etc. Furthermore, the performance measurement server 116 may use such KPI information to identify potential issues (e.g., weak spots) in coverage areas provided by roaming networks. In some cases, a service provider associated with the performance measurement server 116 may collaborate with such roaming networks and share KPI information so as to proactively identify and resolve such issues, thereby improving user experience, network performance, etc.

In some scenarios, the wireless communication device 102 may connect to the home network 200 and enter a region 250 overlapping the coverage area of roaming network 201. In such scenarios, the wireless communication device 102 may have the ability to receive service via the home network 200 or the roaming network 201 (or both). While the wireless communication device 102 may prefer remaining connected to the home network 200 (e.g., to avoid roaming charges), the service provider and/or wireless communication device 102 may determine (e.g., based on data collected and metrics derived therefrom) that user experience would be improved by establishing a connection with the roaming network 201 instead of the home network 200.

Figure 3:
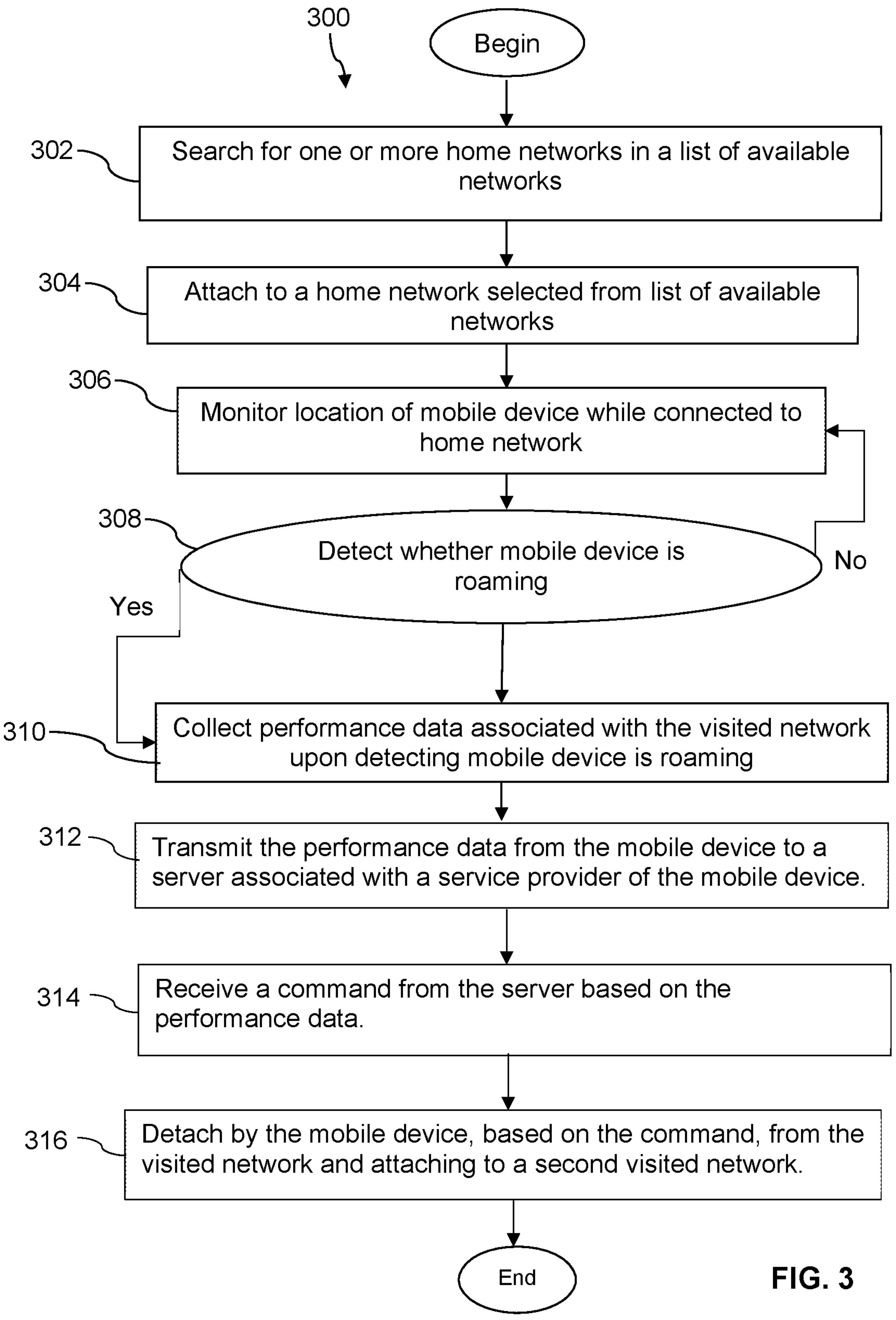
FIG. 3 is a flow chart of a method according to an embodiment of the disclosure.

Turning now to FIG. 3, a method 300 is described. In an embodiment, the method 300 is a method of monitoring and collecting network data in different roaming environments. For discussion purposes, the method 300 will be described as being implemented by a mobile device (e.g., wireless communication device 102) comprising a SIM applet (e.g., applet 122).

At block 302, the method 300 comprises searching for one or more home networks in a list of available networks, which may include a priority list stored on the wireless communication device 102. At block 304, the method 300 comprises attaching to a home network selected from networks in the list of available networks. At block 306, the method comprises monitoring location of the mobile device while the mobile device is attached to the home network. In some aspects, so long as the mobile device is attached to the home network or otherwise not roaming, the SIM applet on the mobile device is configured to remain in an idle or deactivated state in which the SIM applet does not monitor/ collect data. This way, power and resources on the mobile device may be conserved while the SIM applet is in such state.

At block 308, the method 300 comprises detecting whether the mobile device is roaming. If not, the method 300 returns to block 306, where the method 300 continues to monitor location of the mobile device on the home network. However, if a roaming scenario is detected such as when the mobile device moves outside the home network and attaches to a visited network not on the list of available networks, the method 300 proceeds to block 310. At block 310, the method 300 comprises activating the SIM applet upon detecting that the mobile device is roaming such that the SIM applet immediately begins collecting performance data associated with the visited network. In some embodiments, the method 300 may further comprise deactivating the SIM applet upon detecting that the mobile device is no longer in a roaming scenario.

At block 312, the method 300 comprises transmitting the performance data from the mobile device to a server associated with a service provider of the mobile device. At block 314, the method 300 comprises receiving a command by the mobile device from the server based on the performance data. At block 316, the method 300 comprises detaching by the mobile device, based on the command, from the visited network and attaching to a second visited network based on the performance data. Alternatively, in an embodiment, the mobile device determines autonomously (e.g., not based on a command received from the server) to detach from the visited network and to attach to the second visited network based on the performance data.

Figure 4:
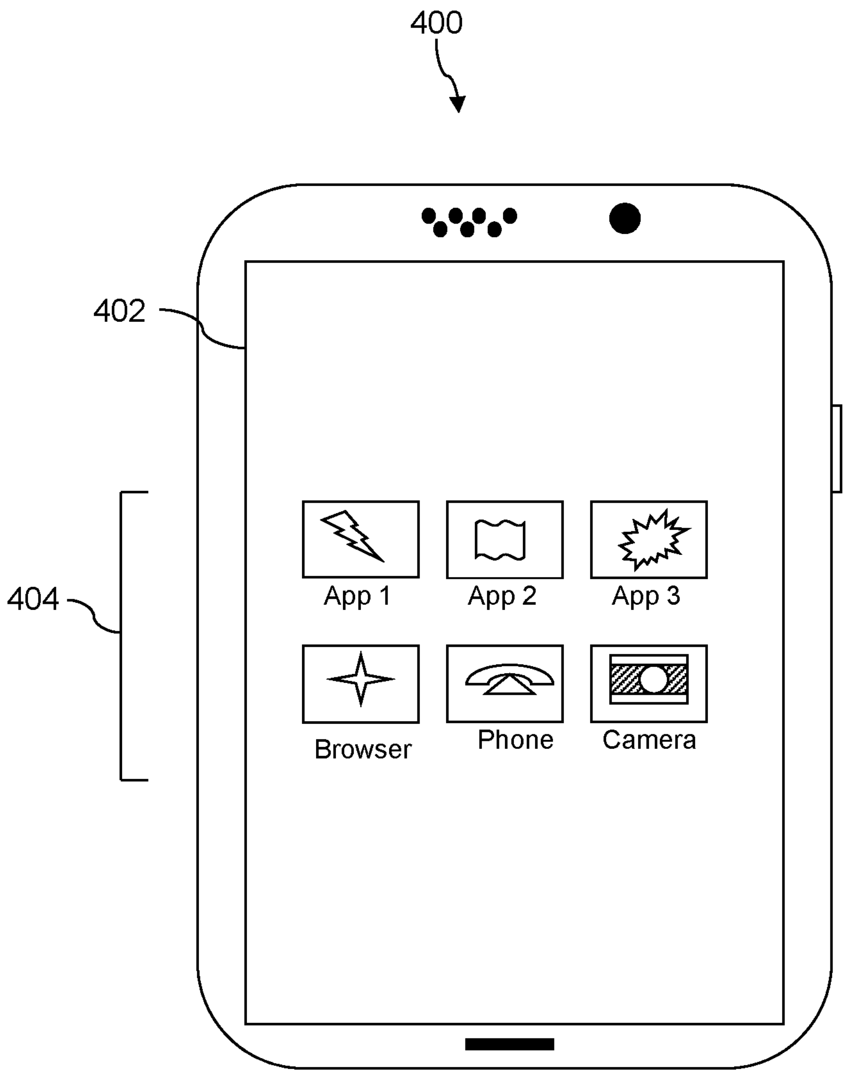
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. For example, the wireless device 102 in FIGS. 1 and 2 may take the form of UE 400. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
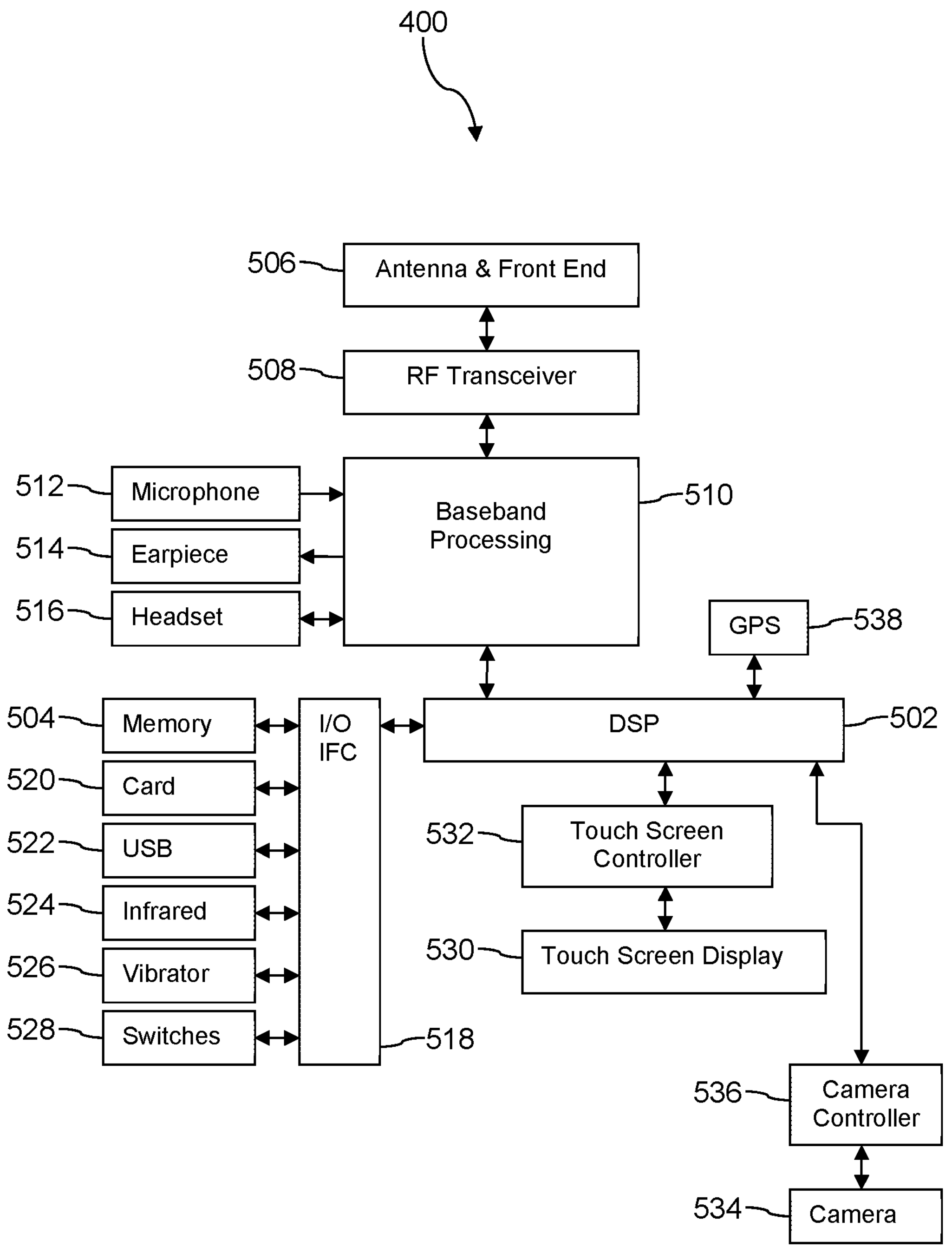
FIG. 5 is a block diagram of a hardware architecture of a mobile communication device according to an embodiment of the disclosure.

FIG. 5 shows a block diagram of the UE 400. In an embodiment, the UE 400 may be used to implement the UE 102 described above. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a Long-Term Evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
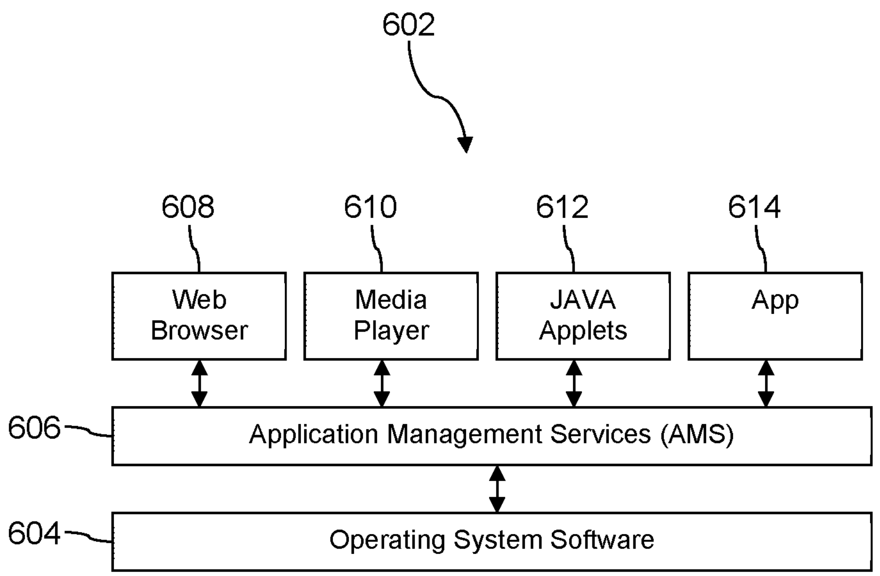
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 11A are a web browser application 608, a media player application 610, JAVA applets 612, and an optional application 614.

In an embodiment, the application 614 supports adapting radio frequency parameters 104 and/or wireless telecommunication protocol selection parameters of the UE 102. In some aspects, the application 614 may comprise the SIM applet 122. In other aspects, the JAVA applets 612 comprise the SIM applet 122. Additionally/alternatively, some or all of the JAVA applets 612 may be disposed within the SIM 108. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
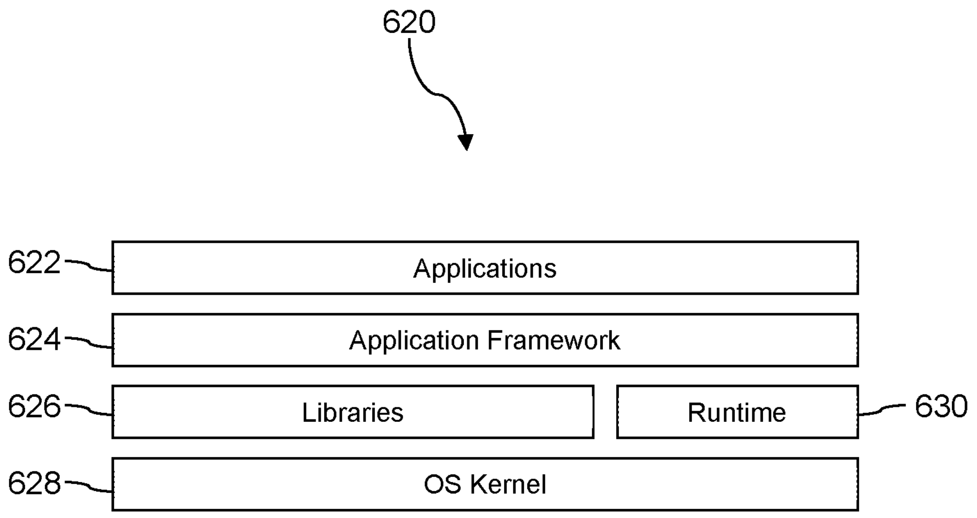
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
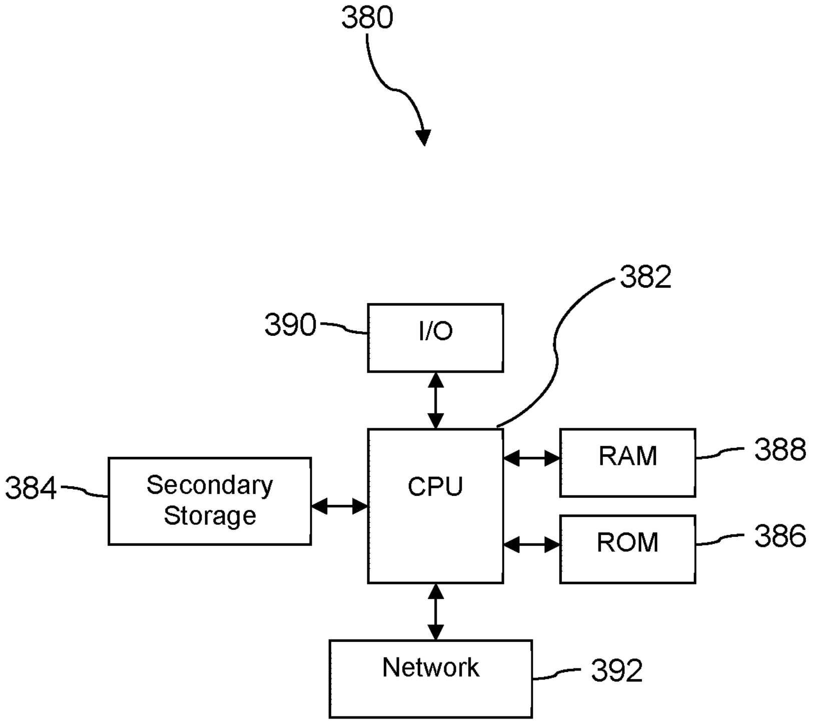
FIG. 7 is a block diagram of a computer system according to an embodiment of the disclosure.

FIG. 7 illustrates a computer system 380 suitable for implementing one or more embodiments disclosed herein. For example, in an embodiment, the performance measurement server 116 described above may be implemented in a form similar to that of computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:

searching, by a mobile device, for one or more home networks in a list of available networks;

attaching, by the mobile device, to a home network selected from the list of available networks;

monitoring, by the mobile device, location of the mobile device after attaching to the home network;

detecting, by the mobile device based on the location of the mobile device, a roaming scenario when the mobile device moves outside the home network and attaches to a visited network not on the list of available networks;

collecting, by a subscriber identification module (SIM) applet on the mobile device, performance metrics associated with the visited network upon detecting that the mobile device is roaming in the visited network;

transmitting the performance metrics from the mobile device to a server associated with a service provider of the mobile device; and detaching, by the mobile device, based on the performance metrics, from the visited network and attaching to a second visited network.

2. The method of claim 1, further comprising:

receiving a command from the server based on the performance metrics; and adjusting a priority order of the list of available networks based on the command.

3. The method of claim 1, further comprising automatically deactivating the SIM applet upon detecting that the mobile device moves outside the visited network and attaches to the home network or another network in the list of available networks.

4. The method of claim 1, further comprising registering by the SIM applet with an application executing on the mobile communication device to receive events associated with the visited network, wherein collecting the performance metrics comprises monitoring the events and collecting network parameters associated with the events by the SIM applet.

5. The method of claim 4, wherein the events comprise a call drop, a network failure, a service interruption, or any combination thereof.

6. The method of claim 4 wherein, when the mobile device has been attached to the same cell site in the visited network longer than a predetermined period of time, the SIM applet drops a portion of the events received from the application executing on the mobile communication device and does not transmit information contained in the dropped events in the performance metrics sent to the server.

7. The method of claim 1, further comprising receiving a command from the server by the mobile device based on the performance metrics, wherein the mobile device detaching from the visited network and attaching to the second visited network is based on the command.

8. The method of claim 1, wherein the SIM applet determines autonomously to detach from the visited network and attach to the second visited network based on the performance metrics, and wherein the detaching is based on the SIM applet determining autonomously to detach.

9. The method of claim 1, further comprising:

activating the SIM applet upon detecting that the mobile device is roaming such that the SIM applet immediately begins collecting the performance metrics associated with the visited network.

10. A communications system, comprising:

a home network;

a network server disposed in the home network; and a wireless communication device in selective communication with the network server, wherein the wireless communication device is configured to:

monitor location of the wireless communication device after attaching to the home network selected from a list of available networks;

detect, based on the location of the wireless communication device, a roaming scenario when the wireless communication device moves outside the home network and attaches to a visited network not on the list of available networks;

collect, by a subscriber identification module (SIM) applet on the wireless communication device, performance data associated with the visited network upon detecting that the wireless communication device is roaming in the visited network; and send the performance data to the network server in the home network, wherein the network server is configured to derive one or more key performance indicators (KPIs) based on the performance data from the wireless communication device.

11. The communications system of claim 10, wherein the network server is configured to combine the performance data with second performance data associated with the visited network.

12. The communication system of claim 11, further comprising one or more second wireless communication devices associated with the home network and configured to send the second performance data to the network server.

13. The communications system of claim 10, wherein the wireless communication device is configured to store a priority list of roaming networks including the visited network.

14. The communications system of claim 13, wherein the network server is configured to command the wireless communication device to modify an order of the priority list based at least on the performance data.

15. The communications system of claim 14, wherein the network server is further configured to command the wireless communication device to modify the order based on second performance data.

16. The communications system of claim 15, wherein the network server is configured to obtain the second performance data from at least one second SIM applet on a second wireless communication device connected to one or more roaming networks in the priority list.

17. A method comprising:

searching, by a mobile device, for one or more home networks in a list of available networks;

attaching, by the mobile device, to a home network selected from the list of available networks;

monitoring, by the mobile device, location of the mobile device after attaching to the home network;

detecting, based on the location of the mobile device, a roaming scenario when the mobile device moves outside the home network and attaches to a visited network not on the list of available networks;

collecting, by a subscriber identification module (SIM) applet on the mobile device, performance metrics associated with the visited network upon detecting that the mobile device is roaming in the visited network; and discontinuing, by the SIM applet, collection of the performance metrics upon detecting that the mobile device has re-attached to the home network.

18. The method of claim 17, further comprising sending the performance metrics to a performance measurement server in the home network.

19. The method of claim 18, further comprising receiving a command from the performance measurement server to perform more collection of the performance metrics when the mobile device is roaming in the visited network as compared to when the mobile device is attached to the home network.

20. The method of claim 17, further comprising collecting, by the SIM applet, less performance metrics in the visited network when a quantity of the performance metrics collected in the visited network reaches or exceeds a threshold.

* * * * *